Oct. 25, 1932.  H. DREYFUS  1,884,627
MANUFACTURE OF ALIPHATIC ANHYDRIDES
Filed Jan. 5, 1929
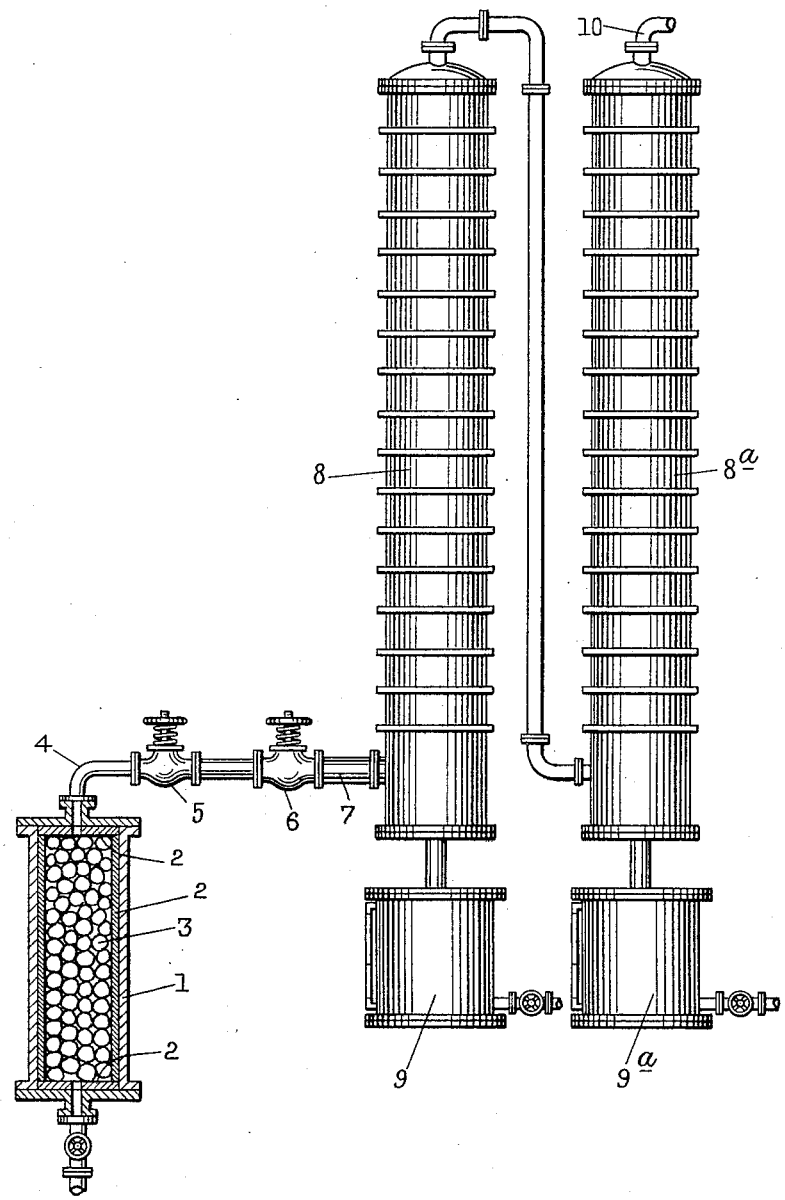
HENRI DREYFUS
INVENTOR
ATTORNEYS Patented Oct. 25, 1932

1,884,627

UNITED STATES PATENT OFFICE

HENRY DREYFUS, OF LONDON, ENGLAND

MANUFACTURE OF ALIPHATIC ANHYDRIDES

Application filed January 5, 1929, Serial No. 330,452, and in Great Britain January 28, 1928.

This invention relates to the manufacture of aliphatic anhydrides from aliphatic acids and especially to the manufacture of acetic anhydride from acetic acid.

In Bulletin de la Société Chimique de France Vol. XXXI (1922) pages 113–118 experiments are described by Peytral wherein acetic acid vapour is led through platinum tubes heated to 1150° C. In these experiments on rapid passage of the vapour, small quantities (about 2 or 2%) of acetic anhydride were obtained, the major part of the liquid obtained by condensation of the reaction vapours consisting of acetic acid and the gaseous decomposition products (such as methane, $CO_2$ etc.) formed were small in quantity; with decreased speed of passage of the vapour, however, the products of decomposition contained no anhydride and considerable quantities of gaseous products such as methane, acetylene, hydrogen, carbon dioxide were formed. It would seem from these experiments that in the case where anhydride was produced the acetic acid vapour was passed through the tube much too fast to allow it to attain a temperature of 1150° C. and that when, owing to slower passage of the acid vapour, the vapour was subjected to higher temperatures, the reaction was more violent and the sole products of decomposition were gases such as methane, $CO_2$, CO etc. My experiments have confirmed this view and I have found that when passing acetic acid vapour through platinum tubes in such manner that the vapour is allowed to attain temperatures of even 700° to 800° C. very considerable decomposition to gaseous products occurs. It is evident from my experiments that when Peytral produced acetic anhydride with but small decomposition to gaseous products the acetic acid vapour must only have attained a temperature below 700° to 800° C., and probably a temperature of from 500° to 700° C.

In the manufacture of acetic anhydride or other aliphatic anhydrides by subjecting acetic acid vapour or other aliphatic acid vapour to the action of heat certain difficulties are liable to arise when employing high temperatures and/or when performing the process for prolonged periods. Thus, for instance, when employing high temperatures the acid vapour may become decomposed with the formation inter alia of gaseous products (e. g. methane, carbon dioxide and carbon monoxide) and carbon, which carbon becomes deposited in the reaction zone or on the catalyst (where a catalyst is employed). Prolonged operation of the process at lower temperatures appears to cause similar destructive decomposition of the acid vapour.

According to the present invention I have now found that aliphatic anhydrides (and especially acetic anhydride) may readily be produced by subjecting aliphatic acid vapour (and especially acetic acid vapour) to thermal decomposition, i. e. to the action of moderately high temperatures under pressures above atmospheric pressure. By these means decomposition to gaseous products or carbon may be largely or entirely avoided.

In performing the invention any pressures above atmospheric may be employed, for example, pressures of from about ordinary atmospheric pressure up to 100 atmospheres or more may with advantage be employed, though it is to be understood that any other superatmospheric pressures may be used if desired.

The reaction may be performed at temperatures of from about 250° to 700° C. and especially at temperatures of from about 250° to 550° C.

If desired the reaction may be performed in the presence of catalysts, for instance, in presence of the water binding agents described in my Patent No. 1,735,956, or, for instance, in presence of one or more phosphoric acids or in presence of any other appropriate catalysts. Such catalysts may, if desired, be deposited or spread upon filling substances or materials such for instance as pumice, kieselguhr, carborundum or the like.

The aliphatic acid vapours may be subjected to the reaction by any suitable means. Conveniently it may be passed in a stream, under the desired pressure, through fused silica, copper or other tubes or apparatus heated to the desired temperature, which tubes or apparatus may if desired be filled with or otherwise contain catalysts, said catalysts being, if desired, spread upon or deposited upon filling substances or materials. In such form of execution the tubes or other form of apparatus may of course be heated to any suitable temperature but the speed of passage of the acid vapor should be so regulated that the temperature of the acid vapour does not attain a temperature higher than about 700° C. and preferably not higher than 400° to 600° C.

The anhydride produced by the process may be separated or recovered from the reaction gases or vapours in any suitable way. Preferably the gases or vapours on leaving the reaction zone are not treated to separate the anhydride under the pressure obtaining in the reaction zone but are first passed through suitable apparatus (for instance, one or more reducing valves) to reduce the pressure of said gases or vapours to atmospheric pressure or other conveniently low pressure.

In order to avoid hydrolysis and consequent loss of anhydride the vapours are preferably not submitted to simple condensation but are treated to separate the anhydride from the water vapour present or formed in the reaction. For instance, the gases or vapours from the reaction zone may, preferably after passing through apparatus wherein the pressure is reduced to atmospheric pressure or other suitable low pressure, be subjected to fractional condensation, for example, by leading them up through one or more fractionating columns maintained at a temperature or temperatures intermediate between the boiling points (under the conditions of pressure obtaining) of the anhydride and of water whereby the anhydride is condensed and the water passes on in vapour form.

Or, for instance, the reaction gases or vapours may, preferably after passing through apparatus wherein the pressure is reduced to atmospheric pressure or other suitably low pressure, be passed through one or more solvents for the anhydride which are insoluble or substantially insoluble in water and of higher boiling point than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzyl ether, tetrachlorethane, paraffin oil, triacetin, phenetol, anisol, one or more cresols, and paracresyl acetate.

Or, for instance, the reaction gases or vapors may, preferably after passing through apparatus wherein the pressure is reduced to atmospheric pressure or other suitably low pressure, be subjected to condensation by the process described in the British Patent No. 303,772, that is to say the anhydride may be condensed from the reaction vapours whilst carrying away the water by the vapour of one or more entraining liquids. In such form of execution the reaction vapours are preferably mixed after leaving the reaction zone with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are, as indicated in said British Patent No. 303,772, benzene, carbon tetrachloride, petrol, mixtures of two or more of such bodies, or mixtures of ether with petroleum ether; it will be understood, however, as explained in the said British Patent No. 303,772, that any other liquids chemically inert to the anhydride and having a high entraining capacity for water may be employed. The liquids should preferably have a low entraining capacity for the anhydride.

Or, for instance, the reaction gases or vapours may, preferably after passing through apparatus wherein the pressure is reduced to atmospheric pressure or other suitable low pressure, be subjected to condensation by the process described in the British Patent No. 298,667, that is to say they may be subjected to condensation by leading them under the surface of an "extracting" liquid cooled down or otherwise kept at temperatures below (and preferably considerably below) the boiling point of water. By the term "extracting" liquid is meant a liquid or liquid mixture in which the anhydride is soluble and which is chemically inert to the anhydride and insoluble or substantially insoluble in water. As examples of such "extracting" liquids may be mentioned benzene, chloroform, and mixtures of ethyl ether or chloroform with one or more hydro-carbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydro-carbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether are especially suitable.

Or, for instance, the reaction gases or vapours may, preferably after passing through apparatus wherein the pressure is reduced to atmospheric pressure or other suitably low pressure, be treated by the process described in my U. S. Patent No. 1,817,614, and corresponding United States application S. No. 242,977 filed 27 December 1927, that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and the resulting risk of loss of anhydride through hydrolysis, and for the best functioning of the treatment the water binding substances should be employed at temperatures above the boiling point of the anhydride, in which case the water can be substantially absorbed and the anhydride pass on in vapour form. The term "water binding" substance means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

It will be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

The accompanying diagrammatic drawing serves to illustrate, by way of example, one convenient form of execution of the invention.

Referring to the drawing, vapours of glacial acetic acid are passed in a rapid stream under a pressure between 5 and 10 atmospheres through the hot reaction vessel 1, this reaction vessel being provided with a fireclay lining 2 and being filled with balls or stones of pumice or kieselguhr coated with sodium pyrosulphate or sodium bisulphate 3. The reaction vessel 1 is heated to a temperature between 700° and 800° C. and the stream of acetic acid vapour regulated to keep the temperature of the acetic acid vapour in the reaction vessel 1 at a temperature between 400° and 600° C. The vapours leave the reaction vessel 1 by the pipe 4 passing thence through the reducing valves 5 and 6 wherein the pressure of the vapours is reduced substantially to normal atmospheric pressure. From the reducing valve 6 the vapours pass through the pipe 7 and thence upwards successively through the fractionating columns 8 and 8a which are kept at a temperature between the boiling points of acetic anhydride and water. The acetic anhydride present in the reaction gases is substantially condensed in the columns 8 and 8a and passes to the receivers 9 and 9a whilst the water vapour together with any uncondensable gases passes from the still 8a via the pipe 10.

What I claim and desire to secure by Letters Patent is:—

1. Process for the manufacture of an aliphatic anhydride which comprises subjecting the vapor of an aliphatic acid to thermal decomposition under pressures above atmospheric pressure.

2. Process according to claim 1 wherein the reaction is performed at temperatures between 250° and 700° C.

3. Process for the manufacture of acetic anhydride which comprises subjecting acetic acid vapor to thermal decomposition under pressures above atmospheric pressure.

4. Process for the manufacture of an aliphatic anhydride which comprises subjecting the vapor of an aliphatic acid to thermal decomposition under a pressure of between 5 and 10 atmospheres.

5. Process for the manufacture of acetic anhydride which comprises subjecting acetic acid vapor to thermal decomposition under a pressure of between 5 and 10 atmospheres.

6. In a process according to claim 1 the step of treating the reaction vapors to separate the anhydride from the water vapor present in said vapors.

In testimony whereof I have hereunto subscribed my name.

HENRY DREYFUS.